3,260,650
REFLECTOR AND COOLANT SEALING STRUCTURE FOR GAS COOLED NUCLEAR REACTOR
Wilbert A. Kalk, Poway, and John F. Petersen, San Diego, Calif., assignors, by mesne assignments, to the United States of America as represented by the United States Atomic Energy Commission
Filed Dec. 27, 1963, Ser. No. 334,061
2 Claims. (Cl. 176—58)

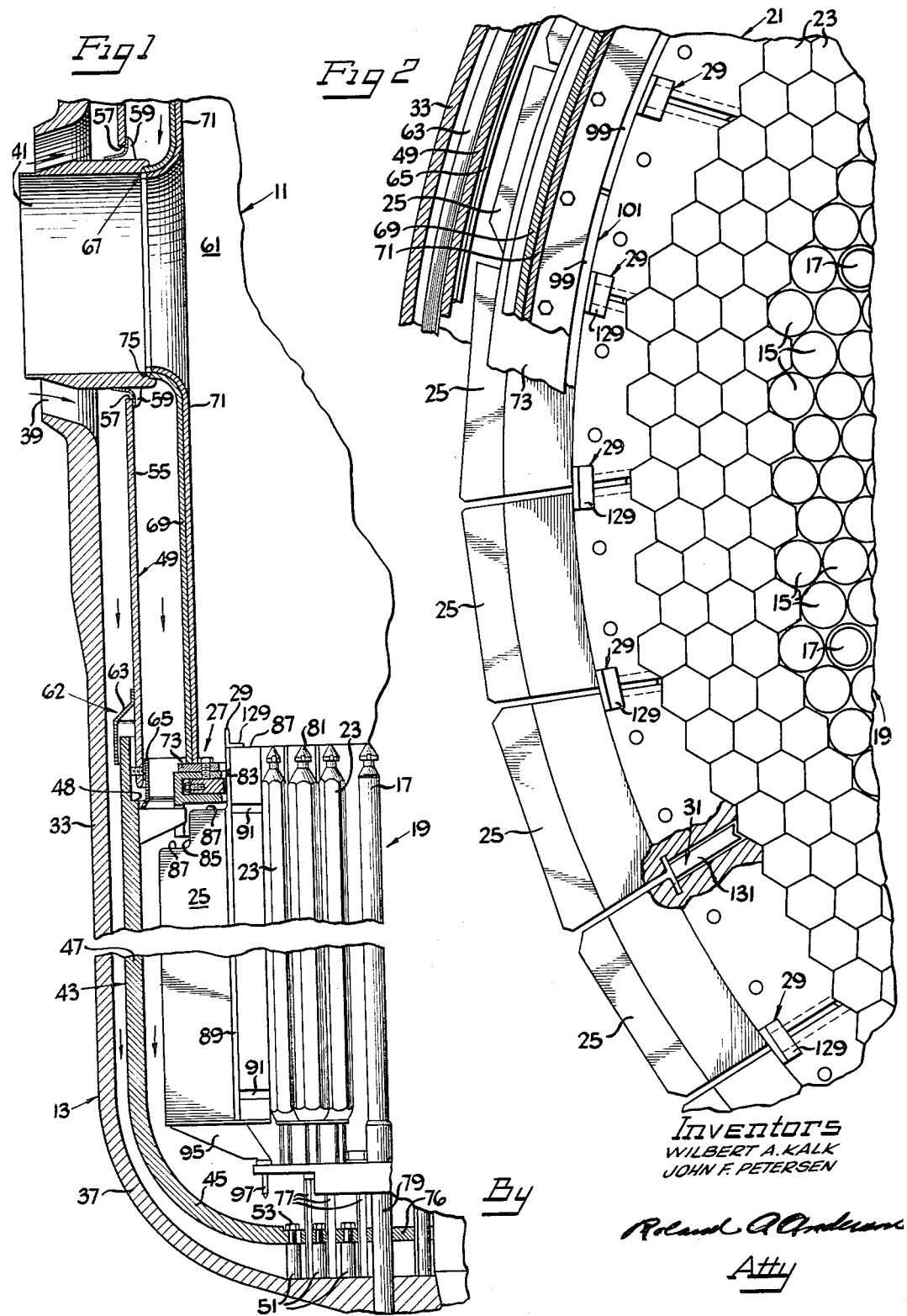

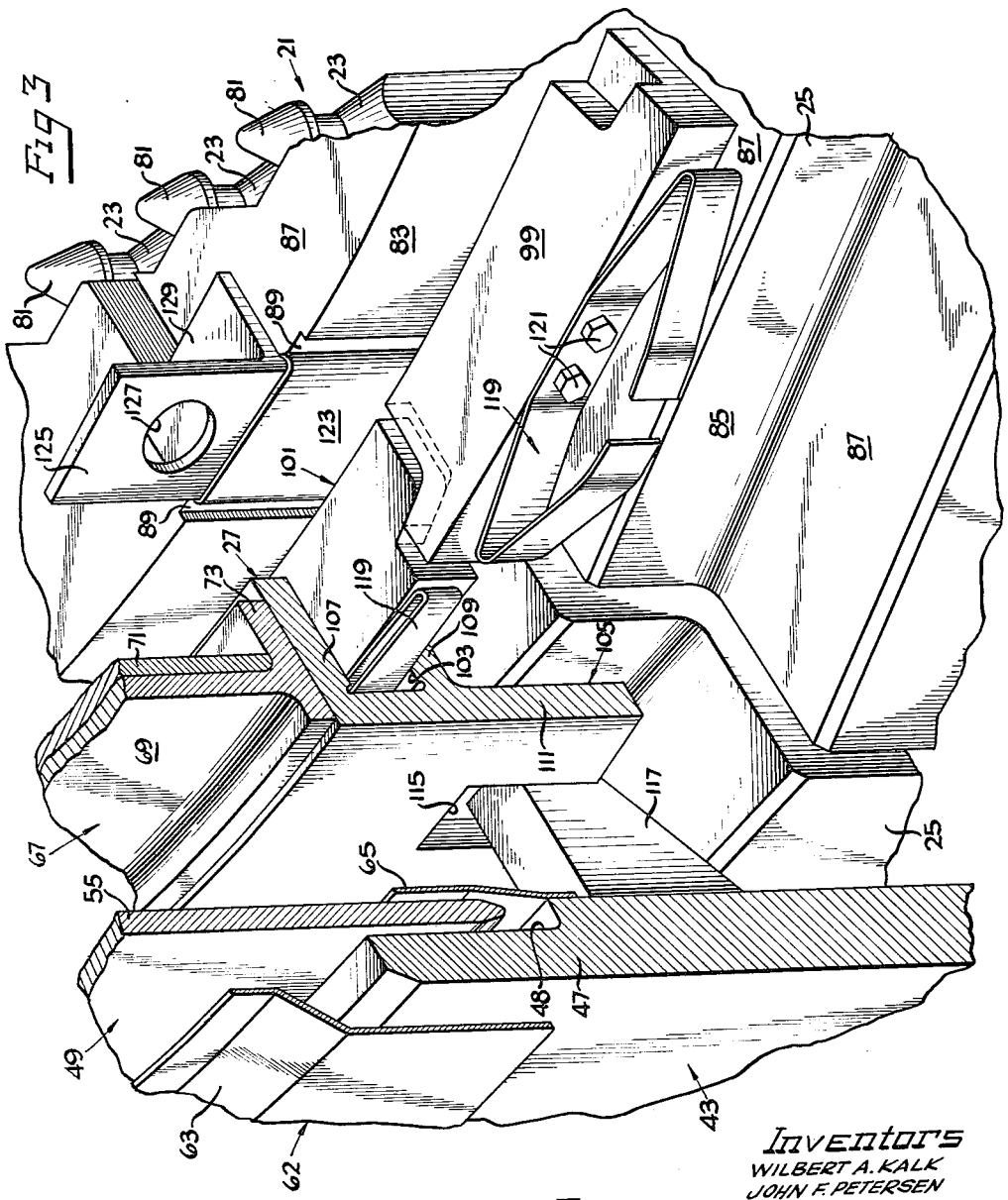

The invention described herein was made in the course of, or under, Contract AT(04–3)–314 with the United States Atomic Energy Commission.

This invention relates to nuclear reactors and, in particular, to neutron-reflecting structures which are adapted to surround the core of such a reactor.

The principal object of the present invention is to provide an improved neutron-reflecting structure for surrounding the core of a nuclear reactor.

An additional object of the invention is to provide a neutron-reflecting structure which can be utilized to exert a pressure on the outer surface of the core of a nuclear reactor so as to hold the elements of the core in compact engagement with one another.

A further object of the invention is to provide a neutron-reflecting structure which can be utilized to exert a pressure on the outer surface of the core of a nuclear reactor so as to hold the elements of the core in compact engagement with one another, but which can be caused to relax such pressure to release the elements of the core for withdrawal and servicing.

A still further object of the invention is to provide a neutron-reflecting structure for surrounding the core of a nuclear reactor, which structure includes a plurality of units movable relative to one another and to the core.

Another object of the invention is to provide a reactor including a plurality of movable neutron-reflecting units surrounding the core of the reactor, and sealing means adapted to limit the flow of a coolant gas between and around the units.

Other objects and advantages of the invention will become apparent with reference to the following description and the accompanying drawings.

In the drawings:

FIGURE 1 is a fragmentary elevational view, partially in section, of a reactor showing various of the features of the invention;

FIGURE 2 is an enlarged partially broken-away fragmentary plan view, partially in section, of the reactor of FIGURE 1;

FIGURE 3 is an enlarged fragmentary perspective view of a portion of the reactor shown in FIGURE 1;

Figure 4:
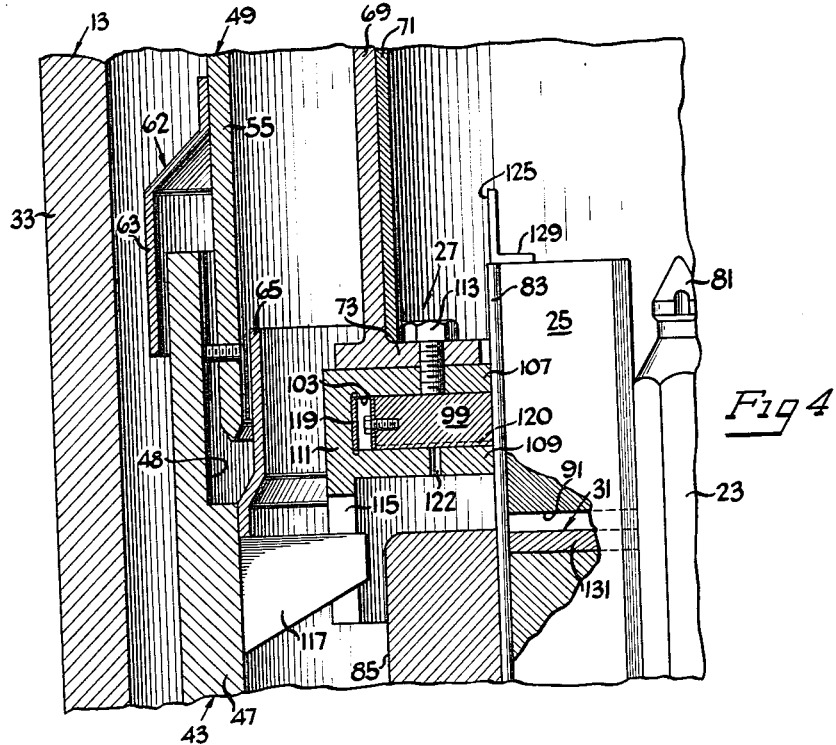
FIGURE 4 is an enlarged fragmentary partially broken-away elevational view of a portion of the reactor of FIGURE 1.
Figure 5:
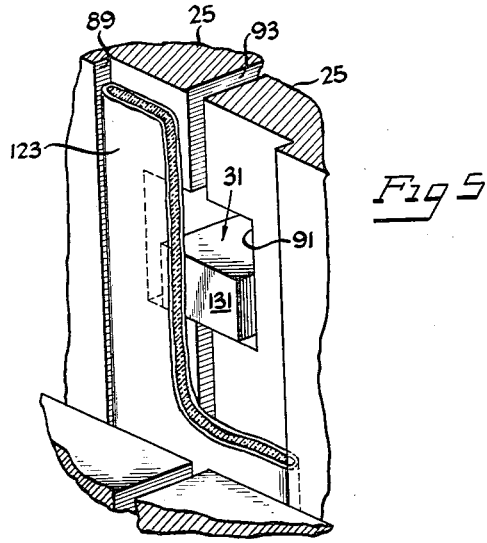
FIGURE 5 is an enlarged fragmentary partially broken-away perspective view of a portion of the reactor seen in FIGURE 4.

Very generally, a nuclear reactor 11, a portion of which is illustrated in the drawings and which constitutes a preferred embodiment of the invention, comprises a pressure vessel 13 through which a coolant gas such as helium is circulated under pressure. A plurality of nuclear fuel elements 15 and control rods 17 are arranged within the reactor to form a core 19 which is surrounded by a neutron-reflecting structure 21 defined by an inner reflector layer comprised of a plurality of mating reflector elements 23, and an outer reflector layer defined by a single row of spaced reflector blocks 25.

The reflector elements and blocks 23 and 25 are suitably supported for movement into pressure engagement with the outer surface of the core 19 in response to pressure exerted on the blocks by the coolant gas so as to maintain the core elements in compact array and limit vibrations thereof when the gas is circulated through the core. However, the reflector elements and blocks are biased for movement away from the core 19 when the gas is not circulated so that the elements of the core may be withdrawn therefrom for servicing or replacement. A top seal 27, a vertical seal 29, and an axial seal 31 are provided for limiting the flow of gas through and around the neutron-reflecting structure.

More particularly, the pressure vessel 13 of the illustrated embodiment (FIGURE 1) is preferably constructed of steel and includes an elongated vertically disposed cylindrical side wall 33 provided with an elliptical top head (not shown) and an elliptical bottom head 37. An opening 39 is provided in the side wall 33 adjacent the top head and includes outwardly flared edges to facilitate attachment thereto of a conduit (not shown) through which the coolant gas enters the vessel and to provide a more gradual change in gas direction and pressure drop. A conduit 41 extends inwardly of the opening 39 in generally concentric relation thereto and, as will be explained in greater detail shortly, serves to conduct the coolant gas outwardly of the vessel 13.

Disposed within the pressure vessel 13 adjacent the lower end thereof is a cup-shaped lower thermal shield 43 formed of steel and including a generally elliptical base 45 and a generally cylindrical upwardly extending side wall 47, the upper edge of which is provided with an inwardly facing annular groove 48 to receive the lower edge of an upper thermal shield 49, hereinafter described.

Preferably the cup-shaped lower thermal shield is positioned within the pressure vessel 13 in substantially coaxial relation thereto, with its side wall 47 and base 45 spaced somewhat from the side walls 33 and bottom head 37 of the vessel. The adjacent wall surfaces define a space through which coolant gas entering the vessel flows in passing from the inlet to the core, which flow serves to cool the walls of the vessel and shield. The shield is supported on the bottom head 37 for lateral floating movement by a plurality of spacer posts 51 held in place by bolts 53 which extend through enlarged openings in the base 45 of the shield and through the posts into threaded holes in the bottom head.

The upper thermal shield 49 is also formed of steel and is located within the upper end of the pressure vessel. The upper thermal shield is of an inverted cup-shaped configuration and includes a generally cylindrical side wall 55 having a diameter generally the same as the diameter of the cylindrical side wall of the lower thermal shield, and is provided at its upper end with an elliptical top wall (not shown). Like the lower thermal shield 43, the upper shield is disposed within the pressure vessel 13 in generally coaxial relation thereto and with its side and top walls spaced from the adjacent walls of the vessel to define a space through which the coolant gas flows. An opening 57 provided with peripheral seals 59 is provided in the side wall of the upper thermal shield to permit passage therethrough of the outlet conduit 41 which extends outwardly from an upper plenum chamber 61, hereinafter described.

With the upper thermal shield so disposed within the pressure vessel 13, its lower edge is positioned in proximity to the groove 48 provided in the upper edge of the lower thermal shield, although the shields are not in contact with one another at this point.

To improve the distribution of the gas flow within the pressure vessel, while enabling the shields to accommodate to warping and misalignment, an elementary seal 62 is provided at the junction of the shields and comprises a metal strip 63 which is attached to the outer surface of the upper thermal shield and which is off-set outwardly and downwardly so as to overlap the upper edge of the lower thermal shield. A second strip 63 is attached to the inner surface of the lower thermal shield and is off-set outwardly and slightly upwardly so as to overlap the lower edge of the upper thermal shield.

The upper plenum chamber 61, previously referred to, is located above the reactor core and receives the coolant gas after it passes through the core. The plenum chamber is defined by a plenum shroud 67 which is suspended within the upper thermal shield 49 and, like the shield, is of an inverted cup-shaped configuration so as to include a generally cylindrical side wall 69 and an elliptical top wall (not shown), each of which is formed of steel and provided with a lining 71 of a heat reflecting material such as stainless steel.

The plenum shroud 67 is smaller than the upper thermal shield 49 and is disposed therein with its side and top walls positioned in spaced relation to the side and top walls respectively of the upper thermal shield so as to define a space intermediate the adjacent wall surfaces through which coolant gas flows. In addition, the lower edge of the side wall 69 of the plenum shroud is positioned in proximity to the upper peripheral edge of the reflector of the core and has an annular inwardly projecting horizontally disposed flange 73 secured thereto to facilitate attachment of the top seal 27, soon to be described. A flared opening 75 is provided in the side wall of the plenum shroud in alignment with the inlet opening 39 of the pressure vessel and is adapted to be connected to the outlet conduit 41, previously referred to, which is disposed concentrically within the inlet conduit (not shown).

The core 19 of the reactor is supported on a core plate 76 which comprises a generally circular, relatively thick slab of steel supported on posts 77 and secured to the bottom head 37 of the pressure vessel 13. The core plate 76 is provided with a plurality of holes (not shown) into which pins provided at the lower ends of the fuel elements 15 are fitted, and has a diameter somewhat greater than that defined by the arrangement of fuel elements and control rods 17 to provide an area adjacent its periphery upon which the elements 23 and blocks 25 of the reflector 21 are supported. Various other openings (not shown) are provided in the core plate to receive control rod guide tubes 79 which extend outwardly through the base 45 of the lower thermal shield and through the bottom head 37 of the pressure vessel to external drive mechanisms (not shown). The specific arrangement of the fuel elements and control rods, as well as their construction, forms no part of this invention and, hence, will not be described in any detail.

To enable a more thorough understanding of the operation of the neutron-reflecting structure 21 which surrounds the core, a description of the various flow paths of the coolant gas through the reactor, as indicated by the arrows in FIGURE 1, will be helpful at this time. As previously mentioned, gas enters the pressure vessel 13 through the inlet opening 39 and, as it strikes the outer surface of the upper thermal shield, it is deflected and divided into two generally equal masses, one of which flows upwardly between the walls of the pressure vessel and the upper thermal shield 49, and the remainder of which flows downwardly between the walls of the pressure vessel and the lower thermal shield 43. The upwardly flowing gas is again deflected as it reaches the top head of the pressure vessel and flows downwardly between the upper thermal shield and the plenum shroud 67, and between the lower thermal shield and the reflector.

The mass of gas which was originally deflected downwardly flows between the lower thermal shield 43 and the vessel wall and then into the space below the core plate 76. A small portion of this flow is passed through holes in the core plate and then into the core. The remainder passes up and around the periphery of the core plate where it joins the gas coming down between the lower thermal shield and the reflector. The combined flow passes into the core and then up into the plenum chamber 61 above the core from which it is exhausted through the outlet conduit 41 to steam generators or the like (not shown).

It should be appreciated that in passing through the core, the coolant gas will undergo a slight pressure drop which will cause the coolant gas pressure on the outside of the core 19 to be slightly greater than the pressure on the inside of the core. As will become apparent shortly, this pressure differential is utilized to hold the elements of the core in compact engagement and prevents vibrations thereof.

The reflector is arranged in encircling relation to the core 19 and, as previously set forth, is comprised of an inner reflective layer including a plurality of mating reflector elements 21, and an outer reflector layer comprised of a single row of spaced reflector blocks 23, such an arrangement having been found to be preferable because of its ability to resist radiation damage. All of the reflector elements and blocks are composed of graphite or other suitable material capable of reflecting neutrons back into the core.

More specifically, the inner reflector layer is composed of three rows of the reflector elements 23, each of which has a length approximating that of the fuel elements and is of a hexagonal cross-sectional configuration to form a barrier to by-passing of gas to the core. The upper ends of the elements 23 are shaped to provide a knot 81 which can be engaged by a grappling device (not shown) whereby the elements may be extracted when necessary.

The elements 23 are arranged relative to one another so as to intimately mate with one another, thereby lessening gas leakage between the elements, and are supported on the core plate 76 so as to be tiltable inwardly of the core and into engagement with the outermost fuel elements 15 in response to pressure exerted on the elements 23 by the outer reflector blocks 25 which, in turn, tilt or pivot inwardly in response to the slightly greater coolant pressure outside the core. However, the reflector elements normally assume an upright non-tilted position when the coolant is not flowing to relax the pressure on the core and permit the fuel elements and control rods to be freely withdrawn from the core for servicing.

The outer reflector layer, as previously mentioned, comprises a single row of elongated vertically disposed graphite blocks, each of which is of generally rectangular or slightly trapezoidal cross-section having a somewhat greater cross-sectional area than the hexagonal elements 23 of the first layer. The blocks are stepped inwardly at their upper ends to provide a pair of inset generally vertical faces 83 and 85 and three off-set upwardly facing surfaces 87 located at different elevations from one another. The rearward surface of each of the blocks 25 is machined (FIGURE 2) to permit mating engagement with the outer surfaces of the outermost hexagonal reflective elements of the inner reflective layer.

To enable the blocks to accommodate the vertical seals 29, which limit the flow of coolant gas radially through the reflector, each of the side faces of the blocks 25 is provided with a longitudinally extending groove 89 which cooperates with the groove of an adjacent block to define an elongated slot into which the seal is placed. To further adapt the blocks to accommodate the axial seals 31, each side face of each block is also provided with a pair of transverse grooves 91, one of which is located adjacent the upper end of the block and the other of which is located adjacent the lower end thereof. These slots cooperate with the transverse slots of adjacent blocks to define channels which receive the axial seals, as hereinafter described.

The blocks are arranged in slightly spaced relation to one another and define a gap 93 therebetween which permits relative movement between the blocks and allows room for their expansion in response to temperature changes. The blocks are supported on the edge portion of the core plate and, in this regard, the lowermost end of each of the reflector blocks 25 of the outer layer is formed to provide an inwardly and downwardly directed foot 95 having a pin 97 projecting downwardly from its lower end. The pin 97 is adapted to be positioned within a hole or slot (not shown) provided in the core plate so that the block, while adequately supported, is capable of limited pivotal as well as vertical movement. Accordingly, when the coolant gas is flowing through the reactor and a pressure differential exists between an interior and the exterior of the core, the blocks are caused to pivot inwardly toward the core and, in doing so, to move the inner reflective elements 23 into engagement with the core so as to hold the fuel elements and control rods in compact array.

It will be seen, therefore, that the elements and blocks 23 and 25 of the reflector structure 21 do not occupy fixed positions relative to one another and to the surrounding structure of the reactor but move toward and away from the core in response to the pressure of the coolant. Movement of the blocks and elements is also effected by the different rates of thermal expansion of the reflector units themselves and the different rates of thermal expansion between the reflector units and other structural members forming of the reactor. Such variability of positions would tend to allow some of the coolant gas to by-pass the core of the reactor and thus detract from the efficiency thereof. To lessen this by-pass flow, seals are provided at various locations and comprise generally the top seal 27 which limits flow between the plenum shroud and the upper edge of the reflector, the vertical seals 29 which limit flow radially through the reflector, and axial seals 31 which limit flow upwardly through the gaps 93 intermediate the reflector blocks.

More specifically, the top seal 27 is adapted to limit the flow of coolant gas between the upper edge of the reflector and the lower edge of the plenum shroud such as would enable the gas to by-pass the core completely and reduce the efficiency of the system. The seal 27 is formed of a plurality of flat slightly arcuate graphite segments 99 (FIGURE 3) of rectangular cross-sectional configuration arranged to form a sealing ring 101 of variable diameter supported so that its inner edge is in intimate engagement with the upper outer stepped faces 83 of the reflector blocks 25. Each segment 99 is both notched and stepped at its ends to provide an overlapping but flexible joint between adjacent segments to limit flow between the segments, one segment being provided for each of the reflector blocks 25.

The ring 101 of the top seal 27 is carried within an annular inwardly facing horizontally disposed channel 103 defined by an annular hoop 105 of F-shaped cross-section which includes an upper horizontal flange 107, a lower horizontal flange 109, and a back wall 111. The annular hoop is secured to the flange 73 at the lower edge of the plenum shroud 67 by circumferentially spaced bolts 113 (FIGURE 4) which extends through the flange of the shroud and are threaded into the upper flange 107 of the hoop. The back wall of the hoop is slotted at circumferentially spaced points 115 to receive a projecting arm 117 which is secured to the lower thermal shield 43 and which retains the hoop in alignment with the reflector structure.

The pressure differential surrounding the segments of the sealing ring 101 normally lifts the segments into contact with the lower surface of the upper flange 107 defining the channel 103 and also urges them inwardly into contact with the upper inset face of the reflector blocks 25. However, in some cases the friction between the segments and the channel may prevent the seal from seating against the reflector blocks. To overcome this frictional force, a leaf spring 119 is placed at the back side of each of the segments to bias it inwardly and comprises (FIGURE 3) a flat metal strip supported edgewise and secured centrally to the rearward edge of the segment by bolts 121. The end portions of the strip are bent outwardly slightly away from the rearward edge of the segment and are then reversed upon themselves and bent inwardly at an acute angle to form a pair of V-shaped sections having their open ends facing one another. The unsecured arms of the springs engage the back wall 111 of the hoop and urge the segments away from the back wall in the direction of the reflector 21. Transverse grooves 120 (FIGURE 4) are provided in the lower face of the segments 99 to receive the upper ends of pins 122 which project through the flange 109 and prevent lateral shifting of the segments.

The vertical seals 29 (FIGURES 2–5) are removably disposed within the vertical slots defined by the grooves 89 of the adjacent reflector blocks 25 and are adapted to limit the flow of coolant radially through the gaps 93 between the adjacent blocks. In addition, the vertical seals are adapted to align the reflector blocks relative to one another so as to prevent one block from slipping deeper into core array than the remaining blocks.

Each of the seals 29 preferably comprises a thin elongated metal strip 123 dimensioned so as to fit comfortably within the vertical slots. Strips formed of solid strips of molybdenum-steel alloy have been found to be satisfactory. The seal strips are of slightly greater length than the slots defined by the blocks 25 so that an upper portion 125 of the seal will project past the upper end of the blocks. This upwardly projecting portion is provided with a hole 127 whereby the seal may be easily engaged for removal. The seals are prevented from bottoming on the core plate 76 by a flange or lug 129 which projects from the inner face of each strip and rests upon the upper surface of the reflector blocks 25.

In order to prevent coolant gas from flowing from the periphery of the core plate upwardly through the gap 93 between the reflector blocks and behind the vertical seals, the axial seals 31 are provided within the channels defined by the grooves 91 adjacent the top and the bottom of each of the reflector blocks 25. Each axial seal 31 comprises (FIGURE 3) an elongated graphite block 131 of rectangular cross-section dimensioned so as to bridge the gap 93 between the blocks. The bottom set of axial seals prevents direct flow upwardly of the gap, while the top set of seals prevents the coolant flow in the core from flowing radially out into the gaps and then through the gap to the upper plenum.

If, during the operation of the reactor, two adjacent reflector blocks grow or contract at different rates due to temperature changes, the channel in which the seals fit could create a shearing effect on the graphite blocks 131. To prevent this, the channels defined by the grooves 91 are longer than the blocks, thereby allowing the block to move somewhat within the channel.

It will be seen, therefore, that an improved neutron-reflecting structure has been provided for the core of a reactor. The structure is capable of exerting pressure on the outer surface of the core so as to maintain the core elements in compact pressure engagement with one another and thereby reduce vibration of the elements. The reflecting structure is also adapted to accommodate itself to the thermal expansions and contractions of its components as well as those of the surrounding portions of the reactor. Seals are provided to limit the by-passing of the core by the gas despite the movement of the reflector so as to prevent a reduction in the efficiency of the reactor.

Although a neutron-reflecting structure has been particularly described which is responsive to the pressure of the coolant gas, it is evident that other means, for example, mechanical means, could be employed to cause the reflecting structure to exert a pressure on the reactor core during operation, but which would permit relaxation of the pressure to facilitate removal of the reflecting components when desired.

While various structural features of the invention have been shown and described with respect to one specific embodiment thereof, it should be apparent that various modifications may be made therein without departing from the scope of the invention.

What is claimed is:

1. In a nuclear reactor having a core supported adjacent the lower end of a vessel and an inner wall extending generally above the core to form a plenum chamber thereabove, a reflector and coolant sealing structure comprising a series of elongated vertically disposed blocks formed of a neutron-reflecting material arranged in side-by-side spaced-apart relation around the periphery of the core and each of said blocks being pivotably supported at its lower end for movement in a direction toward and away from said core, said blocks having a longitudinally extending groove and an upper and a lower transversely extending groove in each of opposing side walls, whereby said adjacent blocks cooperate to define longitudinally extending slots and transversely extending channels, a first sealing element disposed in each of said longitudinally extending slots thereby limiting flow of coolant gas radially by said blocks, a second sealing element disposed within each of said upper and lower transversely extending channels thereby limiting vertical flow of coolant intermediate said blocks, a segmented expandable ring supported by said inner wall, and spring means for biasing said ring into engagement with the upper end of said blocks.

2. In a nuclear reactor having a core supported adjacent the lower end of a vessel and an inner wall extending generally above the core to form a plenum chamber thereabove, a reflector and coolant sealing structure comprising a series of elongated vertically disposed blocks formed of a neutron-reflecting material arranged in side-by-side spaced-apart relation around the periphery of the core and each of said blocks being pivotably supported at its lower end for movement in a direction toward and away from said core, said blocks having longitudinally and transversely extending grooves in each of opposing side walls, whereby said adjacent blocks cooperate to define longitudinally extending slots and transversely extending channels, a first sealing element disposed in each of said longitudinally extending slots thereby limiting flow of coolant gas radially by said blocks, a second sealing element disposed within each of said transversely extending channels thereby limiting vertical flow of coolant intermediate said blocks, means defining an inwardly facing horizontally disposed channel secured to a lower portion of said wall, a segmented expandable ring disposed within said channel, and a leaf spring interposed between segments of said ring and said channel for biasing the segments into engagement with the upper end of said blocks.

References Cited by the Examiner
UNITED STATES PATENTS

| | | | |
|---|---|---|---|
| 2,970,097 | 1/1961 | Correc | 176—85 |
| 3,026,258 | 3/1962 | Huet | 176—29 |
| 3,124,514 | 3/1964 | Koutz et al. | 176—58 |

LEON D. ROSDOL, *Primary Examiner.*

L. DEWAYNE RUTLEDGE, *Examiner.*